Figure 1:
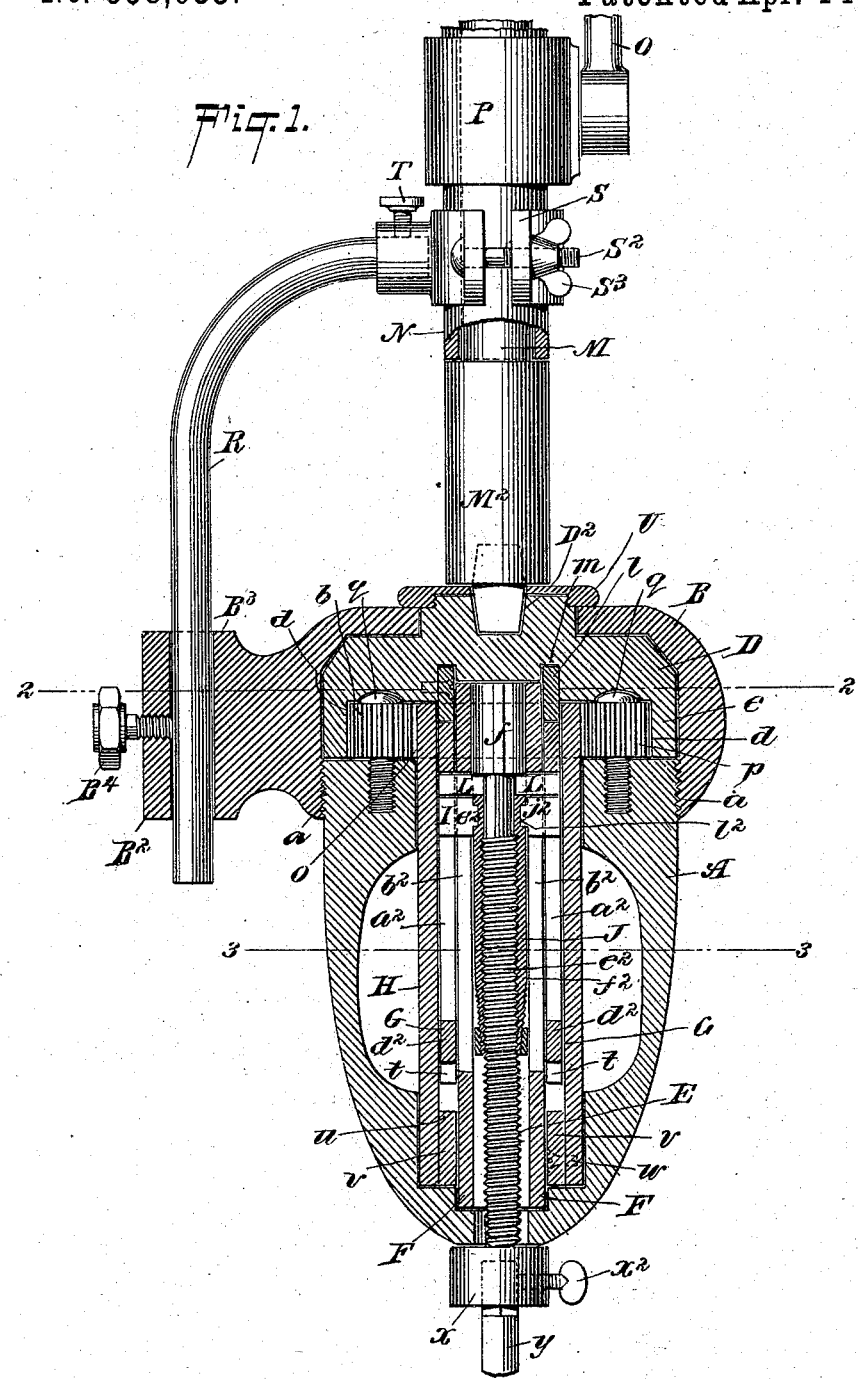

(No Model.)  2 Sheets—Sheet 1.

F. A. ERRINGTON.
AUTOMATIC TAPPING ATTACHMENT.

No. 558,053. Patented Apr. 14, 1896.

WITNESSES:
O. M. Fort
Theodore Bourne

INVENTOR
F. A. Errington
BY T. F. Bourne
his ATTORNEY.

(No Model.) 2 Sheets—Sheet 2.
F. A. ERRINGTON.
AUTOMATIC TAPPING ATTACHMENT.
No. 558,053. Patented Apr. 14, 1896.
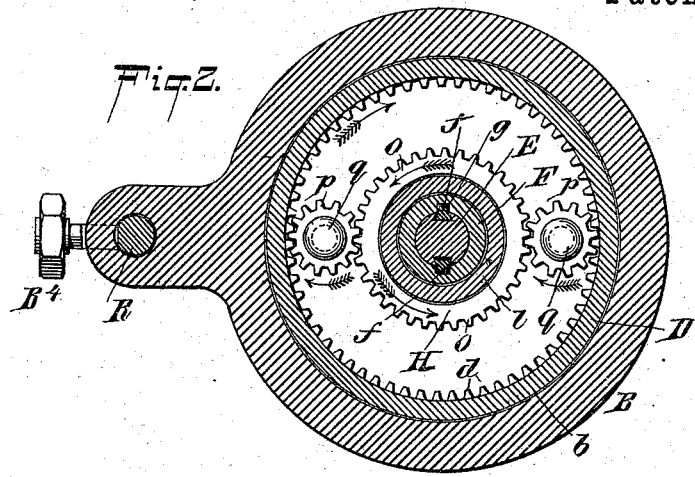
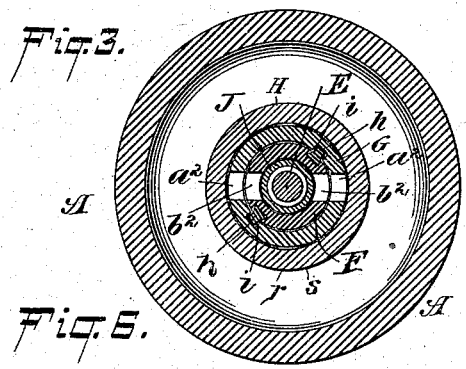
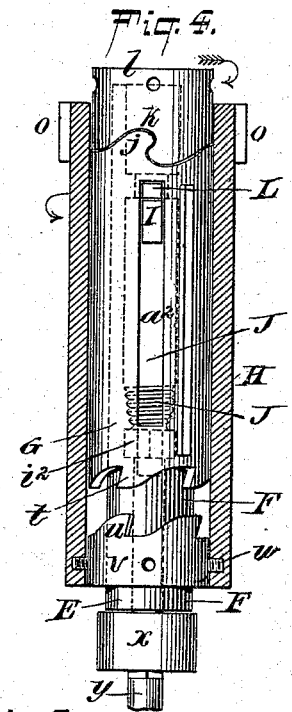
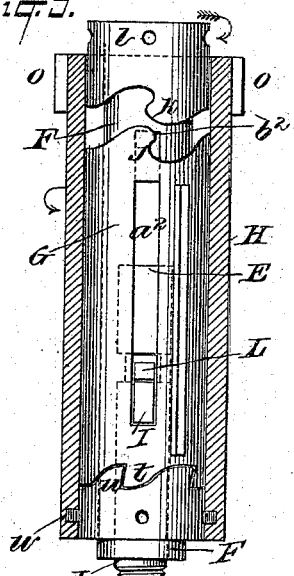
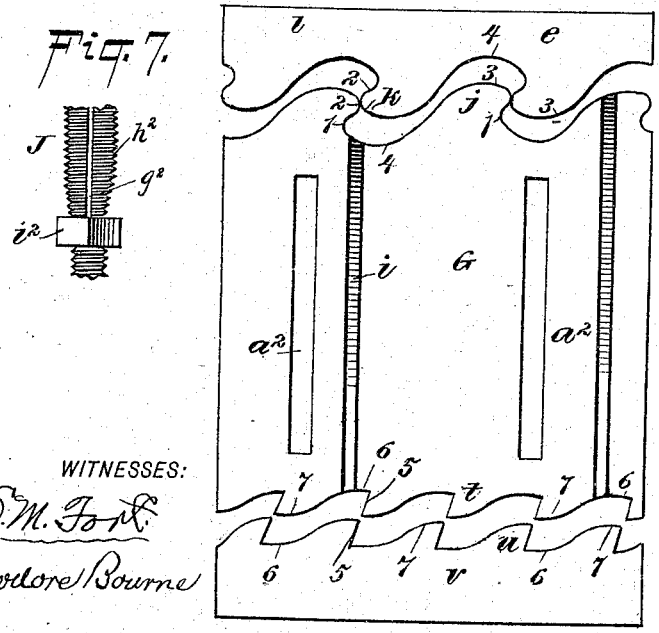
WITNESSES:
O. M. Fork
Theodore Bourne
INVENTOR
F. A. Errington
BY
T. F. Bourne
his ATTORNEY.

UNITED STATES PATENT OFFICE.

FRANKLIN A. ERRINGTON, OF EDGEWATER, NEW YORK.

AUTOMATIC TAPPING ATTACHMENT.

SPECIFICATION forming part of Letters Patent No. 558,053, dated April 14, 1896.

Application filed April 1, 1893. Serial No. 468,647. (No model.)

*To all whom it may concern:*

Be it known that I, FRANKLIN ALFRED ERRINGTON, a citizen of the United States, and a resident of Edgewater, (P. O. Stapleton,) in the county of Richmond and State of New York, have invented certain new and useful Improvements in Automatic Tapping Attachments, of which the following is a specification.
My invention relates, broadly, to means for turning a spindle, shaft, or the like in opposite directions, or to automatically reversing motion from a shaft or driving part whose direction of rotation is constant, by the embodiment of a new principle in the construction of the clutch mechanism, wherein the ratio of certain lengths of the intermediate clutch-formation or member to certain distances between the corresponding parts of the two oppositely-rotative end clutch-formations or members will enable the members at one end, upon being unclutched from rotary engagement and when rotating independently, to positively push or draw by the coaction of their opposing surfaces the clutch members at the other end into rotary engagement; to the means for effecting said disengagement, and more particularly to an automatic tapping attachment of compact form and superior rigidity, adapted for connection with a lathe, drill-press, or other tool. To these ends the invention consists in the novel details of improvement and the combination of parts set forth in this specification and illustrated in the drawings forming part hereof, and then pointed out in the claims.

In the reversing mechanism I have shown in the drawings as illustrating my invention certain of the clutch formations or members are provided with driving-faces that perform two distinct functions, the faces that enable one clutch formation or member to turn the other being called "rotary driving-faces" and the faces that enable one member to push or draw the other longitudinally "longitudinal driving-faces."

Reference is to be had to the accompanying drawings, forming part hereof, wherein—

Figure 1 is a vertical cross-section of a machine constructed in accordance with my invention. Fig. 2 is a horizontal cross-section on the plane of the line 2 2 in Fig. 1, showing the inner face of wheel $o$, with its central bore, the line 2 2 bisecting the device into its two groups of elements—those that rotate the spindle F E in the working direction and those that turn it in the opposite direction. Fig. 3 is a similar view on the plane of the line 3 3 in Fig. 1, showing the slots $a^2$ $b^2$ in the spindle clutch-formation or sleeve G and the tube or auxiliary spindle F and a method of splining said sleeve and tube together. Fig. 4 is a partly-sectional side elevation of my reverse mechanism in the position for driving the spindle in the working direction. Fig. 5 is a similar view showing the parts in position for reversing the direction of rotation of the spindle. Fig. 6 is a developed plan of the clutches, illustrating them in detail at or about the point of disengagement of the rotary driving-faces of two of the clutch-formations or members, and showing, first, that the rotary driving-faces of the other end clutch-member will not become engaged with the rotary driving-faces of the intermediate member until after the rotary driving-faces of the first-mentioned clutch formations or members have been disengaged, and, second, that while the extreme length of said intermediate clutch-formation or member is greater than the shortest distance between the inner faces or opposing surfaces of the two end clutch-formations or members, yet it does not interrupt their independent rotation, (see Fig. 5;) and Fig. 7 is a detail view of a clamping means for holding an adjustable sleeve J, that regulates the reversal of the spindle.

The machine is shown complete and self-contained in a single structure, and as a driving means I have shown my device connected with the longitudinally - movable rotative spindle of a drill-press or similar machine, but gear-wheel D might terminate in a pulley having belt connection with any motive power, be connected to a lathe-spindle having no longitudinal movement, or be otherwise connected and driven. Compactness of the parts and rigidity of the spindle-bearings being desirable, I have shown the frame A of my improved device provided with a counterbore forming a base-plate having a smaller central bore. The reversing-wheel $o$ is provided with a hub H, and said wheel is journaled in said frame by said hub H fitting in said counterbore, and said wheel $o$ is prevented from longitudinal movement by its inner face bearing against the inner face of the driving-wheel D, said wheel D being journaled in the cover or cap piece B, so that when the cover B is brought into position by screw-threads $a$ or similar means the inner face of wheel D bears against the inner face of wheel $o$ and brings the end of the hub H to bear upon said base-plate of the frame A, the parts thus affording mutual support, and thereby securing the simplest and the most compact and rigid construction. To transmit and reverse motion from one of said wheels to the other, the frame A carries the pinions $p$, journaled on studs $q$, said pinions meshing with internal gear-teeth $d$, carried on an extended rim $e$ of wheel D, and also with the spur-gear teeth upon the periphery of wheel $o$.

The longitudinally-movable rotative spindle E is journaled in said wheels and case or frame A B, its axis coinciding with the axes of said wheels, the end of said spindle projecting beyond the opening in the bottom of frame A, being provided with a suitable tool holder or chuck X to receive a tool or tap Y, which may be rigidly clamped to said spindle E by a set-screw $x^2$. In the self-contained device illustrated the spindle E is adapted to have longitudinal movement within the frame A to an extent that would bring the end of said spindle remaining within the device at a considerable distance from its driving means, thus causing more and more torsional strain the farther the tool-carrying end of said spindle progressed from the device before its rotation and longitudinal movement were reversed, and thus interfere with the proper and free action of the automatic shifting clutch mechanism. I have therefore provided a compound spindle F E by making it in two parts splined together by feather $f$ of spindle E (see Fig. 2) meshing with a corresponding groove $g$ in tube F, or otherwise connected to rotate together and be independently movable longitudinally, the tube or auxiliary spindle F having a bearing in the smaller central bore of the base-plate of frame A, above mentioned, and the part E or spindle proper having free longitudinal movement through a still smaller opening in frame A, thus reducing friction, avoiding torsional strains, and assuring the alinement of the spindle E by giving it a long and rigid tubular slideway or bearing in and through the case or frame A B.

To connect the spindle F E with the oppositely-rotative wheels D and $o$ by clutch-joints, said spindle is provided with a clutch formation, sleeve, or member G, which in the automatic device illustrated is shown splined to said compound spindle by the feather $h$ of tube F meshing with a groove $i$ in said sleeve G, (see Fig. 3,) to enable said sleeve to rotate said spindle and be longitudinally movable independent thereof. Each of the wheels D and $o$ are likewise provided with a clutch formation, sleeve, or member, said intermediate longitudinally-movable spindle clutch-formation G having rotary driving-faces 1, 2, and 5 at its opposite ends, forming teeth $j$ and $t$, adapted to secure rotary engagement with the corresponding rotary driving-faces 1, 2, and 5 in the opposing surfaces of said two end or wheel clutch-formations $l$ and $v$, forming teeth $k$ and $u$. However, as above mentioned, the inner faces of wheels D and $o$ bear upon each other, and therefore their clutch-formations $l$ and $v$ cannot be located on their inner faces, as is usually the case in devices of this class. The wheel $o$ is therefore shown provided with a central bore passing from its inner face through its hub H, and the wheel clutch-formation or sleeve $v$ is shown located in said bore and connected with said wheel $o$ by the screws $w$ passing through said clutch-sleeve $v$ and the hub H of said wheel $o$, the inner face of the clutch-sleeve $v$ lying within the plane of the inner face of the wheel $o$, whereby a space or intermediate clutch-chamber is provided in the inner face of wheel $o$ around said spindle F E between the inner face of said clutch sleeve or formation $v$ and the plane of the inner face of said wheel $o$ to receive the intermediate spindle clutch-formation or sleeve G and permit it to rotate and have longitudinal movement within the plane of the inner face of said wheel $o$. This intermediate clutch-chamber between the inner face of the wheel clutch-formation and the plane of the inner face of its respective wheel may vary according to the length of the spindle clutch-formation, or said chamber may be subdivided by recessing both of the wheel clutch-formations within the inner faces of their respective wheels; but one or both of said wheel clutch-formations must be so recessed to enable the inner faces of said wheels to closely approach each other. The improvement in the alinement and support of the spindle and the saving in weight of the whole device by this novel construction are best appreciated by comparison with those of a device where the spindle clutch-formation is located and has its longitudinal movement entirely between, instead of within, the planes of the inner faces of the oppositely-rotative wheels.

While the spindle clutch-formation may be of any suitable form to merely connect said spindle alternately with either of said wheel clutch-formations to secure a completely automatic reversal of said spindle, I employ a novel principle in the construction of the clutch mechanism, in that, while the length of the intermediate spindle clutch-formation or member between the outer extremities of its rotary driving-faces at its opposite ends is less than the shortest distance between the outer extremities of the rotary driving-faces of the end or wheel clutch-formations or members to permit said intermediate clutch-formation or member to be disconnected from rotary engagement with one of said end or wheel clutch-formations or members before having rotary engagement with the other thereof, as is usually the case in such devices, yet the extreme length of said intermediate spindle clutch-formation or member G is greater than the shortest distance between the opposing surfaces 3 7 of said end or wheel clutch-formations or members $l$ and $v$, to render said intermediate spindle clutch-formation or member too long to remain inactive between said opposing surfaces of said end or wheel clutch-formations or members and still clear one end clutch-formation when in full rotary engagement with the other thereof, as shown in Fig. 5. This last condition is secured by the addition on the opposing surface of one of said clutch-formations or members of a longitudinal driving face or faces 3, extending outward longitudinally beyond and sloping backward from the outer extremity of the respective associate rotary driving face or faces of said clutch-formation or member; or said longitudinal driving-face may be subdivided, as shown, between the opposing surfaces of any two of the clutch-formations; or teeth similar to $k\,j$ may be substituted for teeth $t\,u$, thus rendering the "single-acting" automatic-reversing clutch-mechanism shown "double acting" by also providing either or both of the opposing surfaces of the clutch-formations G $v$ with a longitudinal driving-face; but in either and all cases the principle of construction must be the same to enable the disengaging clutch-formations to cause the engagement of the rotary driving-faces that connect the other end of the intermediate clutch-formation with the other end clutch-formation. The tendency of the parts so constructed to jam together is overcome by their form or elasticity, and in this connection attention is called to the advantages of a curved surface or surfaces, (see teeth $j\,k$, Fig. 6,) where the outer extremity or "point of disengagement" of the rotary driving-face merges into a longitudinal driving-face extending outward longitudinally beyond and sloping backward from said outer extremity of the respective associate rotary driving-face. In the device shown this curved form of clutch-formation is carried around into the rotary driving-face, undercutting said face in the form of an ogee, so that while said undercut rotary driving-faces will thus be enabled to remain in rotary engagement during the independent longitudinal movement of the spindle E and sleeve G, as herein explained, the curved surfaces will facilitate their easy disengagement when desired, and as a precaution against the jamming of said clutch members during the coaction of said longitudinal driving-faces 3 3 the opposing surfaces of the clutch-formations G and $v$ (7 6, see Fig. 6) are sloped inward longitudinally and backward from the outer extremity of their respective rotary driving-faces.

The spindle E and sleeve G are shown longitudinally movable independent of each other, and the spindle clutch-formation is to be disengaged from rotary engagement with one wheel clutch-formation and reëngaged with the other thereof. In the machine shown I cause the longitudinal movement of spindle E to accomplish this disengagement of the rotary driving-faces of the clutch-formations or members either automatically by the tap or die Y advancing into or receding from the work or by raising and lowering the frame A, say, by lever O, as hereinafter explained. To connect said spindle E longitudinally with said independently-movable sleeve G to regulate said engagement and disengagement of the rotary driving-faces of the clutch members, the sleeve G and tube F are provided with slots $a^2 b^2$, which register with each other, (see Fig. 3,) the slot $b^2$ in tube F being of greater length than slot $a^2$ in sleeve G, and a stop piece or lug L, carried by spindle E, is inserted in said slot and adapted to engage sleeve G longitudinally at the ends thereof, whereupon the continued longitudinal movement of spindle E would move said sleeve G longitudinally and disengage the rotary driving-faces that connected said spindle clutch-formation with one of said wheel clutch-formations. To render said stop-piece adjustable, I have shown the sleeve G, with its slot $a^2$, of considerable length, and added an adjustable stop-piece I, connected with a clamping-sleeve J, of sufficient length to project through the opening in the bottom of frame A within reach of the operator when spindle E is extended. (See Fig. 5.) By this means the longitudinal movement of spindle E can be regulated by setting the stop-pieces L and I at a greater or less distance apart to engage the end or ends of slot $a^2$ of sleeve G sooner or later, as desired, the stop piece or pieces I being clamped in position by screwing the nut $i^2$ up the tapered and threaded surface $h^2$ of clamping-sleeve J, and thereby closing the slots $g^2$ cut in said sleeve J, locking the internal threads $f^2$ of said sleeve to the external threads $e^2$, shown provided on spindle E for this purpose. This construction permits the use of a small nut $i^2$, and thus not increasing the bore of tube F, while permitting sleeve J to have a bearing within tube F to steady said spindle. It is thus seen that the stop-piece, although carried by the spindle, is enabled to directly engage the intermediate clutch-formation and control its action.

The coaction of the parts is as follows: P is the stationary head of a drill-press or similar tool, carrying a pinion controlled by lever O, said pinion meshing with a rack on the non-rotary longitudinally-movable sleeve N, which forms a bearing for the rotative spindle M and moves said spindle longitudinally from the lever O. The spindle M is provided with a socket $M^2$ to receive the shank $D^2$. These parts may be of usual or approved design, as usually found in such tools or machines.

The wheel D of my device is shown provided with a centrally-located tapered bore to receive the shank $D^2$, and is thereby connected with the longitudinally-movable rotative spindle M. The arm R connects the case A B with some non-rotary part of the drill-press—say sleeve N—to prevent said case from rotating. Upon the spindle M being rotated wheel D will be turned in the same direction thereby, which will be right hand or in the driving direction, and the internal gear-teeth $d$, carried on its rim $e$, will turn the pinions $p$, which will transmit and reverse the motion to wheel $o$, which will thereby be turned in the opposite direction to wheel D. As the lever O is raised the device A B rises with it, and the spindle, with its stop-pieces and clutch-formation, assumes the position shown in Fig. 5, the spindle E turning left hand or in the reverse direction. Upon the device being lowered the tool Y encounters the work and causes the spindle E to rise in the device with its stop-pieces independently of the sleeve G until the stop-pieces L encounter the upper end of slot $a^2$ in sleeve G, when said sleeve G will be moved longitudinally with said spindle out of rotary engagement with the reversing clutch-formation $v$ and the continued upward movement of spindle E (or, more accurately speaking, the downward movement of the case A B) carries the spindle clutch-formation G into rotary engagement with the driving-wheel clutch-formation $l$, and the rotation of spindle E is thereupon reversed to right hand or the driving direction, the longitudinal downward movement of drill-spindle M and case A B ceases, and the tap or die Y advances into the work by the spiral action of its teeth in the usual manner, carrying the spindle E longitudinally with it until the stop-pieces 1 encounter the lower end $d^2$ of slot $a^2$. The continued rotation of the parts continues the longitudinal movement of said tap or die Y and spindle E, and said spindle clutch-formation G is moved longitudinally with said spindle through the medium of the stop-piece I until its rotary driving-faces thereby become disconnected from the rotary driving-faces of the driving clutch-formation $l$, whereupon the continued rotation of the driving clutch-formation $l$ causes the longitudinal driving-faces 3 3 to pass over each other and push the intermediate spindle clutch-formation longitudinally into rotary engagement with the reversing-wheel clutch-formation $v$, whereupon the direction of rotation of spindle F E is automatically reversed and the tap or die Y recedes from the work; but said retrograde movement of tool Y and spindle E cannot automatically reëngage the rotary driving-faces of the clutch-formations $l$ and G, as the opposing surfaces of the clutch-formations $v$ and G are not provided with a longitudinal driving face or faces. Therefore after the automatic reversal of the spindle F E the case A B is raised by means of lever O as the tap or die recedes from the work. It is here noticeable that, while the rotary driving-faces 1 2 of clutch-formations $l$ and G are fully engaged by hand, (through the medium of the lever O, stop-pieces L, &c.,) the rotary driving-faces 5 of clutch-formations $v$ and G are automatically engaged solely by the coaction of the longitudinal driving-faces 3 3 without further external aid after the disengagement of the rotary driving-faces 1 2 than the continued rotation of the driving part. In other words, the longitudinal driving-faces 3 3 overcome the "dead-center" after the disengagement of one set of rotary driving-faces by causing the engagement of the other set thereof.

While the length of the intermediate spindle clutch-formation G should allow the opposing surfaces 3 3 of the clutch-formations G and $l$ to freely pass each other, yet, as shown in Fig. 5, they preferably pass each other so closely as to enable them to force the rotary driving-faces 5 5 into full rotary engagement. This full engagement of the rotary driving-faces at one end of the intermediate clutch-formation by the longitudinal driving-faces at the opposite end, while desirable in a positively-acting device, the undercutting of the rotary driving-faces, as shown at 5 5, or other equivalent means may aid in completing the engagement of said rotary driving-faces whose engagement is primarily caused by said longitudinal driving-faces 3 3. The undercutting of the rotary driving-faces of the clutch-formations G and $l$, as above mentioned, by enabling said rotary driving-faces to remain in contact during the longitudinal movement of the spindle 8 and its stop-pieces, provides a space between the top of said slot and the top of said stop-pieces before the sleeve G moves longitudinally under the automatic coaction of said longitudinal driving-faces, thereby avoiding jamming of these parts.

While the construction of the parts may be greatly varied in adapting the device to its full range of work, the feature of recessing one or both of the clutch-formations within the plane or planes of the wheels, for the purposes above explained, I believe to be especially valuable, particularly where the device is applied to a drill-press, where compactness is of importance, sufficient longitudinal movement being provided in the spindle of the machine itself. The compacting of the device by this method not only greatly reduces its cost, &c., but also greatly reduces its weight, which is important, as, if too heavy, it could not be held firmly in a vertical position by the friction of the taper-shank used in such machines, and which is practically the only method of readily bringing the device in line with the machine-spindle. Then, again, the automatic reversing clutch-mechanism is readily seen to be adapted to any similar purpose, the conditions here given showing many variations of movement, such as the longitudinal movement of the spindle through the case and the longitudinal movement of the case on the spindle, the independent longitudinal movement of the spindle and its clutch-formation while rotating together, and their temporary longitudinal connection by the stop-pieces to disengage the rotary driving-faces of the clutch-members, &c., all of which parts may be greatly varied in their construction and still perform their individual parts in the general functional results.

Having now described my invention, what I claim is—

1. The combination of two wheels, each of said wheels being provided with a clutch-formation, a non-rotative part carrying gearing to transmit and reverse motion from one of said wheels to the other, a longitudinally-movable spindle, a tube surrounding said spindle and connected to rotate therewith, and a clutch-formation connected with said spindle and adapted to engage either of said wheel clutch-formations to turn said spindle, said spindle and said spindle clutch-formation being movable longitudinally independent of said tube, substantially as described.

2. The combination of three rotative clutch-formations or members located in line and having rotary driving-faces in their opposing surfaces, certain of said clutch-formations or members having a longitudinal driving face or faces extending outward longitudinally beyond and sloping backward from the outer extremity of the respective associate rotary driving face or faces, certain of said rotary driving-faces extending inward longitudinally and sloping backward from their respective outer extremities, certain of said clutch-formations or members having longitudinal movement to engage to rotate one another, and means to disengage said rotary driving-faces, the length of the intermediate clutch-formation or member between the outer extremities of its rotary driving-faces at its opposite ends being less than the shortest distance between the outer extremities of the rotary driving-faces of the two end clutch-formations or members, and the extreme length of said intermediate clutch-formation or member being greater than the shortest distance between the opposing surfaces of said end clutch-formations or members, substantially as described.

3. The combination of two end clutch-formations or members, means for rotating said clutch-formations or members in opposite directions, a longitudinally-movable intermediate clutch-formation or member located between said two end clutch-formations or members, said clutch-formations or members having rotary driving-faces in their opposing surfaces to turn one another, one of said clutch-formations or members having a longitudinal driving face or faces extending outward longitudinally beyond and sloping backward from the outer extremity of said rotary driving face or faces, the length of said intermediate clutch-formation or member between the outer extremities of its rotary driving-faces at its opposite ends being less than the shortest distance between the outer extremities of the rotary driving-faces of said two end clutch-formations or members, and the extreme length of said intermediate clutch-formation or member being greater than the shortest distance between the opposing surfaces of said end clutch-formations or members, and means to disengage said rotary driving-faces, substantially as described.

4. The combination of two wheels, each of said wheels being provided with a clutch-formation, means for rotating said wheels in opposite directions, a spindle, a clutch-formation connected to rotate with said spindle and capable of longitudinal movement thereon, said spindle clutch-formation being located between said wheel clutch-formations and adapted to have rotary engagement with either thereof, a stop-piece carried by said spindle and adapted to engage longitudinally with said spindle clutch-formation, substantially as described.

5. The combination of two wheels, each of said wheels having a clutch-formation, means for rotating said wheels in opposite directions, a spindle, a clutch-formation or sleeve connected to rotate with said spindle and movable longitudinally thereon, one of said elements having a slot, and a stop-piece carried by said spindle and located in said slot, whereby said stop-piece is enabled to have longitudinal engagement with said spindle clutch-formation or sleeve, substantially as described.

6. A longitudinally-movable rotative spindle, a wheel and a clutch-formation driven by said spindle, combined with another longitudinally-movable spindle, a clutch-formation connected therewith, another wheel having a clutch-formation, a non-rotary part carrying gearing to transmit and reverse motion from one of said wheels to the other, whereby said last-mentioned spindle can be rotated in opposite directions, and an adjustable stop-piece on one of said spindles to limit the longitudinal movement of said oppositely-rotative spindle, substantially as described.

7. The combination of two wheels, each of said wheels having a clutch-formation, means for rotating said wheels in opposite directions, a spindle, a clutch-formation or sleeve connected to rotate with said spindle and capable of longitudinal movement thereon, one of said elements having a slot, a clamping-sleeve adjustably connected with said spindle, and a stop-piece projecting from said clamping-sleeve and meshing with said slot, whereby said stop-piece is enabled to have longitudinal engagement with said spindle clutch-formation or sleeve, substantially as described.

Signed at New York, in the county of New York and State of New York, this 30th day of March, A. D. 1893.

F. A. ERRINGTON.

Witnesses:
TIMOTHY J. SHEA,
T. F. BOURNE.